(No Model.)
A. DEININGER.
APPARATUS FOR THE MANUFACTURE OF ALCOHOL.
No. 258,029. Patented May 16, 1882.
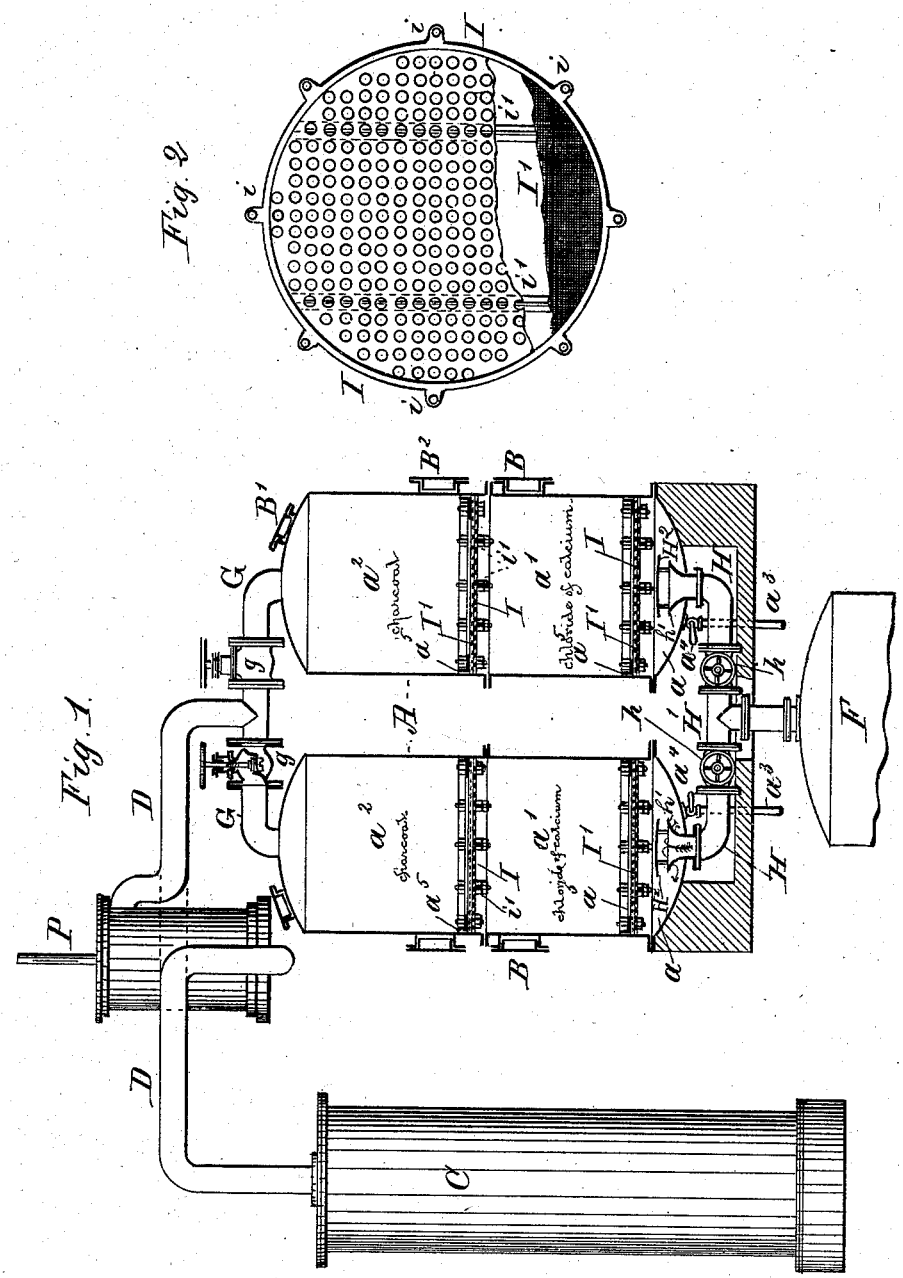
Witnesses
Wm. A. McElwee
O. F. Presbrey
Inventor
August Deininger
pr Henry Orth
atty.

UNITED STATES PATENT OFFICE.

AUGUST DEININGER, OF BERLIN, GERMANY.

APPARATUS FOR THE MANUFACTURE OF ALCOHOL.

SPECIFICATION forming part of Letters Patent No. 258,029, dated May 16, 1882.

Application filed November 1, 1881. (No model.) Patented in Germany June 30, 1880, No. 12,340; in Belgium June 16, 1881, No. 54,927; in France October 31, 1881, No. 145,601; in England October 31, 1881, No. 4,761; in Italy November 21, 1881, No. 71, (XXVII;) and in Austria-Hungary January 2, 1882, Nos. 35,884 and 48,552.

*To all whom it may concern:*

Be it known that I, AUGUST DEININGER, a subject of the King of Prussia, residing at Berlin, German Empire, have invented certain new and useful Improvements in Apparatuses for the Manufacture of Alcohol; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the distillation of alcohol from the mash as heretofore conducted two operations are necessary in order to obtain a product containing ninety per cent., or more, of alcohol—namely, the distillation of the mash and the redistillation or rectification of the distillate. This rectified spirit, however, is more or less contaminated with fusel or aromatic oils and ethers—such as methyl, amyl, propyl—and other oils and ethers or alcohol which are of a deleterious nature and affect the taste of the product materially. One of the objects of this invention is to effect the distillation and rectification at one and the same time, and the other is to eliminate these deleterious oils, ethers, or alcohols from the distillate; and to that end the invention consists in an improved apparatus for the manufacture of alcohol, as fully described hereinafter, and specifically pointed out in the claims, and as shown in the accompanying drawings.

In these drawings, Figure 1 is a sectional elevation of the apparatus, and Fig. 2 is a plan view of one of the diaphragms.

This apparatus consists essentially of a vessel, A, preferably of cylindrical shape, divided into three superposed chambers, $a$ $a'$ $a^2$, by means of two diaphragms. The chamber $a$ is provided with a discharge-pipe, $a^3$, having a suitable stop-cock, $a^4$, the chamber $a'$ with a charging-gate, B, and the chamber $a^2$ with charging and discharging gates B' B², respectively, said gates B B' B² being arranged to hermetically close their respective apertures. The upper part or dome of the cylinder A is connected with a condenser, C, by a suitable pipe, D, which may be connected with an exhaust or suction pump, P, that serves to facilitate the passage of the alcohol vapors through the vessel A to the condenser C. At its lower end said vessel A is connected by a suitable pipe, H, with the rectifying-column F of the still. I have shown part of the said rectifying-column only, and do not consider it of importance to illustrate any particular form of still or rectifying-column or condenser, as such do not form a part of this invention, except in their combination with the vessel A. Any of the well-known constructions of still rectifying-column and condenser may therefore be employed in connection with the said vessel A. In order to facilitate the process of distillation and rectification, and to avoid the loss of time which would naturally result from the use of one vessel A when the contents thereof are to be renewed, which renewal would necessitate the stoppage of the still, I employ a second vessel A, as shown in the drawings.

The two vessels A and A are both constructed alike, as above described, and they are connected at top by suitable pipes, G, provided with valves $g$, or other suitable means of closure, with the pipe D, the pump P, and the condenser. At bottom said vessels are connected by pipes H, provided with like valves or stopcocks $h$, with the pipe H' of the rectifying-column F of the still. As above set forth, the vessels A A are divided into three chambers by means of diaphragms of wire-gauze or perforated metallic plates, or a combination of these, as shown in the drawings. These diaphragms are composed of a sheet of wire-gauze, I', and of a perforated plate, I, of metal, provided with ears or lugs $i$, by means of which they are bolted upon annular flanges $a^5$, and at the same time serve to secure and support the wire-gauze I'.

To prevent sagging of the diaphragms cross-pieces $i'$ may be secured to the vessels A A, and to facilitate the fitting of these diaphragms in their respective places within the vessels A A the bottom (preferably dome-shaped) thereof is screwed thereto, as shown.

The operation of the apparatus is as follows:

The chamber $a'$ of each vessel is charged with chloride of calcium and the chamber $a^2$ with charcoal. The chloride of calcium I prefer to use in lumps not larger than a man's fist, or in lumps weighing from six to eight ounces. One of said vessels is then placed in communication with the rectifying-column F by opening one of the valves $h$ in pipes H H' and with the condenser C by opening one of the valves in pipes G D, and the still is started next. The vapors ascending through the rectifying-column pass first through the layer of chloride of calcium, which, having a great affinity for water, will take up the aqueous vapors carried over with the alcohol vapors, and also acts to destroy the chemical relations of the deleterious vapors of methyl, amyl, propyl, and other alcohol and ethers, known as "fusel-oil," in such manner that a certain quantity of pure alcohol is recovered from them. These vapors, deprived of moisture, then pass through the charge of charcoal, whereby the fusel-oil is eliminated from the alcohol. The purified alcohol vapors then pass through pipes G and D to the condenser, where they are condensed, and in this manner I obtain a product direct from the mash containing ninety-five per cent. of pure alcohol—a result that, so far as I know, has heretofore not been obtained. The distillate is tested from time to time, and when the alcoholmeter indicates a percentage less than ninety-five it is evidence that the quantity of chloride of calcium in chamber $a'$ has so far diminished that the aqueous vapors carried over or mixed with the alcohol vapors are not properly eliminated. The stop-cocks $h\ g$ in the second vessel are then opened and those of the first vessel closed, its contents removed, and the vessel is recharged ready for operation. In this manner the continuous distillation and rectification may be carried on for any desired length of time. As the chloride of calcium is gradually dissolved during the process of distillation and rectification it is collected in the chamber $a$ of the vessel, from which it may be drawn off through pipe $a^3$ by opening the stop-cock $a^4$.

To prevent the chloride-of-calcium solution from passing into the rectifying-column F the pipes H are made to project some distance into chamber $a$, and their mouths $h'$ are made trumpet-shaped or flaring outward, and are covered by a hood or shield, $H^2$, as shown.

The charcoal discharged from the vessels is revivified by any of the well-known methods of calcination in close retorts, and the chloride-of calcium solution is evaporated in the usual manner in vacuum-pans or otherwise, and both can thus be used over again many times.

To facilitate the passage of the vapors through the vessels A A and their contained charges of chloride of calcium and charcoal, an air-pump, P, may be employed and connected with the pipe leading to the condenser, though this is not absolutely necessary. This pump may be arranged in any convenient manner to draw the vapors through the vessels and from them into the condenser C.

Having now described my invention, what I claim, and desire to secure by Letters Patent, is—

1. In a rectifying apparatus, the vessel A, provided with the diaphragms I I' and the layers of chloride of calcium and charcoal, substantially as and for the purpose specified.

2. The distilling and rectifying apparatus hereinbefore described, composed of a still, F, the twin rectifying-vessels A A, constructed and arranged to contain each a layer of calcium chloride and a layer of charcoal, substantially as described, a condenser, an air-pump, and suitable valved connecting-pipes between the elements described, whereby either one or both the rectifying-vessels may be used, substantially as and for the purpose specified.

3. The vessel A, having chamber $a$ and discharge-pipe $a^3$, in combination with the valved pipe H H', projecting within said chamber and carrying the hood or shield $H^2$, substantially as and for the purpose specified.

4. The vessel A, having chamber $a$ and discharge-pipe $a^3$, the valved pipe H H', projecting within said chamber and terminating in a flaring mouth, $h'$, in combination with the hood or shield $H^2$ and the rectifying-column F, all arranged and operating substantially as and for the purpose specified.

5. The vessel or vessels A A, provided with internal flanges, $a^5$, and having inlet and outlet pipes H G, discharge-pipe $a^3$, charging-gates B B', and discharging-gate $B^2$, all capable of being hermetically closed, in combination with two diaphragms composed of a perforated metallic plate, I, and a wire-cloth, I', secured to said flanges and dividing said vessels into three chambers, $a\ a'\ a^2$, all constructed, arranged, and operating substantially as and for the purpose specified.

In testimony whereof I affix my signature, in presence of two witnesses.

AUGUST DEININGER.

Witnesses:
GEORGE LOUBIER,
BERTHOLD ROI.